United States Patent
Song (10) Patent No.: US 9,716,768 B2
(45) Date of Patent: Jul. 25, 2017

(54) CACHE SYSTEM AND METHOD FOR PROVIDING CACHING SERVICE

(75) Inventor: Chang Hyeon Song, Seongnam-si (KR)

(73) Assignee: NHN Corporation, Gyeonggi-do (KR)

( * ) Notice: Subject to any disclaimer, the term of this patent is extended or adjusted under 35 U.S.C. 154(b) by 1590 days.

(21) Appl. No.: 13/354,127

(22) Filed: Jan. 19, 2012

(65) Prior Publication Data

US 2012/0191834 A1    Jul. 26, 2012

(30) Foreign Application Priority Data

Jan. 21, 2011   (KR) .................. 10-2011-0006354

(51) Int. Cl.
*G06F 15/173* (2006.01)
*H04L 29/08* (2006.01)
*H04L 29/14* (2006.01)

(52) U.S. Cl.
CPC ...... *H04L 67/2842* (2013.01); *H04L 67/2885* (2013.01); *H04L 69/40* (2013.01)

(58) Field of Classification Search
CPC . H04L 67/2842; H04L 67/2885; H04L 69/40; G06F 8/65; G06F 9/5077
USPC ........................................................ 709/223
See application file for complete search history.

(56) References Cited

U.S. PATENT DOCUMENTS

| 6,438,652 | B1 | 8/2002 | Jordan et al. | |
| 6,779,038 | B1* | 8/2004 | Minyard | H04L 47/10 370/319 |
| 2006/0089935 | A1* | 4/2006 | Clifford | G06F 9/505 |
| 2008/0201360 | A1* | 8/2008 | Kohli | H04L 63/10 |

(Continued)

FOREIGN PATENT DOCUMENTS

| JP | 2001-125830 | 5/2001 |
| JP | 2002-523838 | 7/2002 |

(Continued)

OTHER PUBLICATIONS

M. O. Choi, I. W. Lee, S. O. Lee and H. J. Park, "A Design and Implementation of the Contents Sharing Service on the Peer-to-Peer based Virtual Home Platform," The 9th International Conference on Advanced Communication Technology, Gangwon-Do, 2007, pp.*

(Continued)

*Primary Examiner* — Taylor Elfervig
(74) *Attorney, Agent, or Firm* — Harness, Dickey & Pierce P.L.C.

(57) ABSTRACT

Provided are a cache system and a caching service providing method using a cache cloud structure. The cache system may include a plurality of cache servers, each, configured to be independently driven, and configured to be registered to a corresponding virtual layer among a plurality of virtual layers that are managed by a management server, and the management server operating on a storage device and configured to transmit information about at least one registered cache server to at least one client that is connected to the corresponding virtual layer. The at least one client is configured to generate or update a server list in response to the transmitted information, and the registered cache server and the at least one client are configured to be connected to each other based on the server list.

11 Claims, 4 Drawing Sheets

(56) References Cited

U.S. PATENT DOCUMENTS

| | | | |
|---|---|---|---|
| 2009/0031032 A1* | 1/2009 | Shanmugham | H04L 65/1073 709/229 |
| 2009/0044265 A1* | 2/2009 | Ghosh | G06F 21/552 726/14 |
| 2010/0100604 A1* | 4/2010 | Fujiwara | G06F 12/0866 709/213 |
| 2011/0161335 A1* | 6/2011 | Dash | G06F 17/30194 707/758 |
| 2012/0096461 A1* | 4/2012 | Goswami | G06F 9/45558 718/1 |
| 2012/0110177 A1* | 5/2012 | Malobrodsky | H04L 12/6418 709/225 |

FOREIGN PATENT DOCUMENTS

| | | |
|---|---|---|
| JP | 2009-259206 | 11/2009 |
| JP | 2010-519613 | 6/2010 |
| KR | 10-2001-0106061 | 11/2001 |

OTHER PUBLICATIONS

G. Florin C. Toinard. 1992. A new way to design causally and totally ordered multicast protocols. SIGOPS Oper. Syst. Rev. 26, 4 (Oct. 1992), 77-83.*

Yuji Shono, mixi, NicoNico video, livedoor memcached best practices learned by examples, Web+DB Press vol. 47, First edition, Japan, Gijutsu-Hyohron Co., Ltd., 2008.12.1, vol. 47, pp. 69-72 (reference showing well-known art).

May 12, 2015 Japanese Office Action issued in corresponding Japanese Application No. 2012-008736.

Dec. 22, 2015 Japanese Office Action issued in corresponding Japanese Application No. 2012-008736.

* cited by examiner

CACHE SYSTEM AND METHOD FOR PROVIDING CACHING SERVICE

CROSS-REFERENCE TO RELATED APPLICATION

This application claims priority from and the benefit of Korean Patent Application No. 10-2011-0006354, filed on Jan. 21, 2011, which is hereby incorporated by reference for all purposes as if fully set forth herein.

BACKGROUND

Technical Field

Exemplary embodiments of the present invention relate to a cache system and a caching service providing method using a cache cloud structure.

Discussion of the Background

In a caching solution according to a related art, each client of a plurality of clients is connected to all necessary cache servers. If a problem occurs in a cache server in such a configuration, each client needs to verify the problem by itself and to independently perform hashing using its own cache server list. The term "client" indicates a system that uses the caching solution and may indicate, for example, a web server or a web application server (WAS) in a general web system.

That is, a client itself needs to solve a problem that occurs in a cache server using the caching solution and thus, a client oriented fault tolerance of adding a function to the whole clients may be necessary. In addition, when each client independently maintains a cache server list, a consistency issue may occur between the hash tables maintained in the respective clients. For example, an issue regarding whether a hash about the same key may match another cache server may still remain.

Accordingly, there is a desire for safer and more efficient cache technology.

The above information disclosed in this Background section is only for enhancement of understanding of the background of the invention and therefore it may contain information that does not form any part of the prior art nor what the prior art may suggest to a person or ordinary skill in the art.

SUMMARY

Exemplary embodiments of the present invention provide a cache system and a caching service providing method that may enhance a performance and scalability by directly connecting a client and a cache server without using a proxy server.

Exemplary embodiments of the present invention also provide a cache system and a caching service providing method that may control all of cache servers by operating only an is integrated cloud management server without a boundary between a private cloud and a public cloud.

Exemplary embodiments of the present invention also provide a cache system and a caching service providing method that enables a client to access a necessary cache server using a service code of the client.

Additional features of the invention will be set forth in the description which follows, and in part will be apparent from the description, or may be learned by practice of the invention.

An exemplary embodiment of the present invention discloses a cache system that includes a plurality of cache servers, each, configured to be independently driven, and configured to be registered to a corresponding virtual layer among a plurality of virtual layers that are managed by a management server, and the management server operating on a storage device and configured to transmit information about at least one registered cache server to at least one client that is connected to the corresponding virtual layer. The at least one client is configured to generate or update a server list in response to the transmitted information, and the registered cache server and the at least one client are configured to be connected to each other based on the server list.

Another exemplary embodiment of the present invention discloses a management server that includes a storage device, a virtual layer manager stored on the storage device and configured to manage a plurality of virtual layers, and an information transmitter configured to transmit information about a registered cache server to at least one client that is connected to a corresponding virtual layer, when the cache server is registered to the corresponding virtual layer among the plurality of virtual layers. The management server is configured to connect the is registered cache server and the at least one client in response to a server list generated at the at least one client using the transmitted information.

Still another exemplary embodiment of the present invention discloses a client system that includes a storage device, an information receiver configured to receive, through a management server, information about a cache server registered to a virtual layer that is managed by the management server, a server list manager configured to generate or update a server list using information about the registered cache server and save the server list in the storage device, and a communication unit configured to communicate with the cache server registered to the virtual layer based on the server list.

Yet another exemplary embodiment of the present invention discloses a cache server that includes a storage device, a communication unit operating on the storage device and configured to communicate with at least one client accessing using a server list. The cache server is configured to be registered to a virtual layer among a plurality of virtual layers that are managed by a management server. Information about the registration is transmitted from the management server to the at least one client that is connected to the corresponding virtual layer. Also, the server list is generated or is updated at the at least one client using information about the registration.

Yet another exemplary embodiment of the present invention discloses a method that uses a processor to provide a caching service, the method including registering, using the processor, each of a plurality of cache servers, being independently driven by a management server, to a corresponding virtual layer among a plurality of virtual layers, and, transmitting information about the registered cache server to at least one client that is connected to the corresponding virtual layer. A server list is generated or is updated at the at least one client is using the transmitted information, and the registered cache server and the at least one client are connected to each other based on the server list.

Still another exemplary embodiment of the present invention discloses a method that uses a processor to provide a caching service, the method including managing, using the processor, a plurality of virtual layers, and transmitting information about a registered cache server to at least one client that is connected to a corresponding virtual layer, when the cache server is registered to the corresponding virtual layer among the plurality of virtual layers. A server list is generated at the at least one client using the transmitted information, and the registered g cache server and the at least one client are connected to each other based on the server list.

Still another exemplary embodiment of the present invention discloses a method that uses a processor to provide a caching service, the method including receiving, through a management server, information about a cache server registered to a virtual layer that is managed by the management server, generating or updating, using the processor, a server list using information about the registered cache server; and communicating with the cache server registered to the virtual layer based on the server list.

Still another exemplary embodiment of the present invention discloses a method that uses a processor to provide a caching service, the method including communicating, using the processor, with at least one client accessing using a server list. The cache server is registered to a virtual layer among a plurality of virtual layers that are managed by a management server. Information about the registration is transmitted from the management server to the at least one client that is connected to the corresponding virtual layer. Also, the server list is generated or is updated at the at least one client using information about the registration.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity Like reference numerals in the drawings denote like elements. Throughout the drawings and the detailed description, unless otherwise described, the same drawing reference numerals are understood to refer to the same elements, features, and structures. The relative size and depiction of these elements may be exaggerated for clarity, illustration, and convenience.

It should be understood that when an element is referred to as being "connected to" another element, it can be directly connected to the other element, or intervening elements may be present. In contrast, when an element is referred to as being "directly connected to" another element, there are no intervening elements present. It would be understood that for the purposes of this disclosure, "at least one of X, Y, and Z" can be construed as X only, Y only, Z only, or any combination of two or more items X, Y, and Z (e.g., XYZ, XYY, YZ, ZZ). It should also be understood that any element, operation or command described herein is not to be construed as being an essential or principle feature of the present disclosure unless otherwise explicitly described. As used herein, the singular forms "a", "an" and "the" are intended to include the plural forms as well unless otherwise indicated. If only a single item is intended, the term "one" or similar terms will be used herein.

Hereinafter, exemplary embodiments of the present invention will be described in detail with reference to the accompanying drawings.

A cache system according to exemplary embodiments of the present invention may be a service for quickly and safely providing a caching function and may be configured as a is cache cloud computing.

Figure 1:
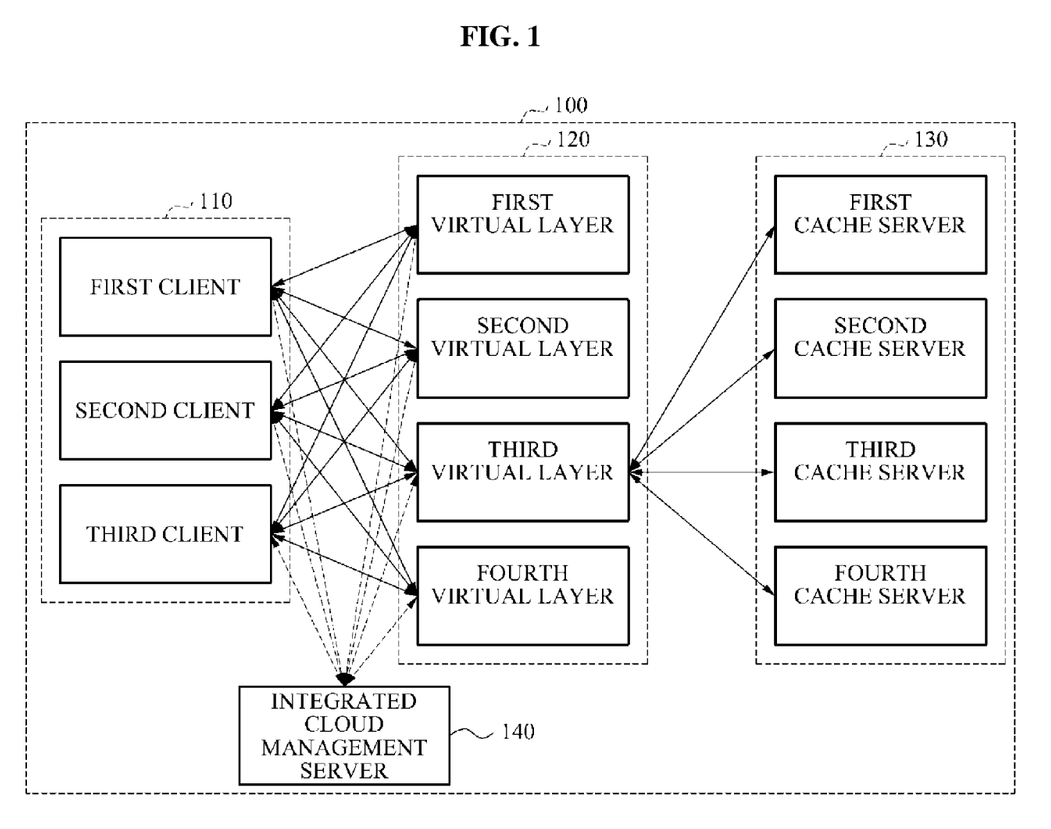
FIG. 1 is a block diagram illustrating the overall configuration of a cache system according to an exemplary embodiment of the present invention.

FIG. 1 is a block diagram that illustrates an overall configuration of a cache system 100 according to an exemplary embodiment of the present invention. Referring to FIG. 1, the cache system 100 may include a plurality of clients 110, a plurality of virtual layers 120, a plurality of cache servers 130, and an integrated cloud management server 140.

While FIG. 1 illustrates three clients, first to third clients, as the plurality of clients 110, four virtual layers, first to fourth virtual layers, as the plurality of virtual layers 120, and four cache servers, for example, first to fourth cache servers, as the plurality cache servers 130, the number of components as above is only an example to help the understanding of the present invention and thus, the present invention is not limited thereto. For example, the number of components may vary depending on the embodiments. Also, in the exemplary embodiment, the plurality of cache servers 130 are registered to the third virtual layer and thus, a certain number of cache servers required for each of other virtual layers may be registered to a corresponding virtual layer. In addition, even though the plurality of clients 110 and the plurality of virtual layers 120 are connected respectively as denoted by arrows, it should be understood that each client 110 may be connected to any desired virtual layer among the plurality of virtual layers 120 and that not all clients are necessarily connected to all virtual layers.

Each client 110 may be a client system that desires to receive a caching service, such as a web server, an application server, and the like. Each client 100 may include one or more storage devices for its operation. Each client 110 may generate and manage a server list, which is a list of cache servers registered to a corresponding virtual layer. The server list may be stored in one of the storage devices of the client 110 for further operation. For example, a client connected to the third virtual layer may obtain information about the plurality of cache servers 130, that is, the first to the fourth cache servers through the third virtual layer and the integrated cloud management server 140, and may generate or update the server list using the obtained information. The plurality of virtual layers 120 may be managed by the integrated cloud management server 140. The integrated cloud management server 140 may transmit information about registered cache servers to clients that are connected to the corresponding virtual layer. Therefore, each client 110 may generate and manage a server list using information received from the integrated cloud management server 140.

Here, each client 110 may receive a caching service through at least one cache server registered to a corresponding virtual layer using a server list that is managed by the client. In this example, cache servers and clients included in the cache system 110 according to exemplary embodiments may be directly connected to each other without using a proxy server. Accordingly, it is possible to enhance a performance and scalability.

Each cache server in the cache system 100 may be independently driven and, in this case, be automatically registered to a virtual layer to which a corresponding cache server belongs. That is, when a cache server is driven, the integrated cloud management server 140 may register the driven cache server to a corresponding virtual layer. FIG. 1 shows an example of the integrated cloud management server 140 that has registered the first to the fourth cache servers to the third virtual layer. In this example, since the cache servers are independently driven without using a proxy server and communicate through a virtual layer, network traffic does not occur between the cache servers. Accordingly, the network performance may be enhanced.

In addition, as described above, the integrated cloud management server 140 may transmit information about a registered cache server to clients that are connected to the corresponding virtual layer among the plurality of clients 110. If the registered cache server is removed or non-functioning, the integrated cloud management server 140 may transmit information about the removed or non-functioning cache server to the clients that are connected to the corresponding virtual layer.

Each client 110 may generate or update the server list using information about the registered cache server, or information about the removed or non-functioning cache server, and may change a hashing value with respect to keys using the above information. In this example, when transmitting messages including information about the registered cache server, or information about the removed or non-functioning cache server, the integrated cloud management server 140 may match a key hashing conformability by observing a total order and a causal order using a distributed coordination service. For example, each client 110 may register an event to a server list about cache servers that are registered to a corresponding virtual layer. When the server list is updated, each client 110 may automatically receive an event message and verify the updated server list and change a hashing value.

A virtual layer may correspond to a service among the provided services. That is, cache servers registered to the virtual layer may be used to provide a caching service for the service. Such virtual layer may be included in the integrated cloud management server 140 and thereby be managed.

According to an exemplary embodiment of the present invention, a virtual layer may perform a functionality of a virtual proxy as a virtual service proxy node. That is, the integrated cloud management server 140 includes the virtual layer capable of performing the functionality of the virtual proxy and is in charge of managing the desired cache servers using the virtual layer. Therefore, instead of controlling cache servers for each of a private cloud and a is public cloud, it is possible to control almost all the desired cache servers using only an operation of the integrated cloud management server. Also, since cache servers are connected to clients via a virtual layer through the integrated cloud management server 140 but without involving a proxy server, it is possible to enhance a performance and scalability. In another exemplary embodiment, a plurality of integrated cloud management servers 140 configured as above may also be provided. For example, when an error occurs in an integrated cloud management server 140, the error may be automatically recovered by another integrated cloud management server 140.

In addition, the overall structure may be simplified through development and countermeasure by more efficiently employing, to open source software, components used for virtual layer detection, failure detection, failover, and the like.

Figure 2:
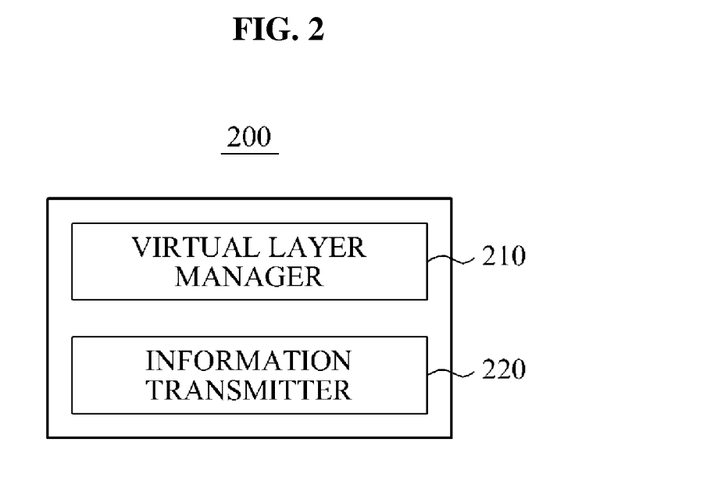
FIG. 2 is a block diagram illustrating a configuration of an integrated cloud management server according to an exemplary embodiment of the present invention.

FIG. 2 is a block diagram that illustrates a configuration of an integrated cloud management server 200 according to an exemplary embodiment of the present invention. The integrated cloud management server 200 of FIG. 2 may be the integrated cloud management server 140 of FIG. 1. Referring to FIG. 2, the integrated cloud management server 200 may include a virtual layer manager 210 and an information transmitter 220.

The virtual layer manager 210 may manage a plurality of virtual layers. A virtual layer may be used to classify a plurality of cache servers, and a caching service with respect to a service may be provided using a virtual layer. For example, cache servers to be used by a client may be registered using a virtual layer and thereby be used to provide a caching service for a service of the client.

In this example, the plurality of virtual layers may be the plurality of virtual layers 120 of FIG. 1, and cache servers may be the plurality of cache servers 130 of FIG. 1.

When a cache server is registered to a corresponding virtual layer among the plurality of virtual layers, the information transmitter 220 may transmit information about the registered cache server to at least one client that is connected to the corresponding virtual layer. The at least one client may be at least one client among the plurality of clients 110 of FIG. 1. In this example, when the registered cache server is removed or non-functioning, the information transmitter 220 may also transmit information about the removed or non-functioning cache server to the at least one client.

For example, when a cache server is registered to at least one virtual layer and is removed, or when the registered cache server is non-functioning, the integrated cloud management server 200 may verify a circumstance of the cache server using at least information about the above registration, and removal or non-functioning of the cache server. Also, the integrated cloud management server 200 may transmit received information to a client, thereby enabling the client to generate or update a server list of the client. In this example, the integrated cloud management server 200 may transmit, to at least one client, messages including at least one of information about the registered cache server and information about the removed or non-functioning cache server based on a total order and a causal order.

In this example, a hashing value of a key may be changed at the at least one client using at least one of the information about the registered cache server and the information about the removed or non-functioning cache server. As described above, the above processes of the integrated cloud management 200 may be performed to control all of cache servers using only an operation of the integrated cloud management server 200, and to match a key hashing conformability.

Figure 3:
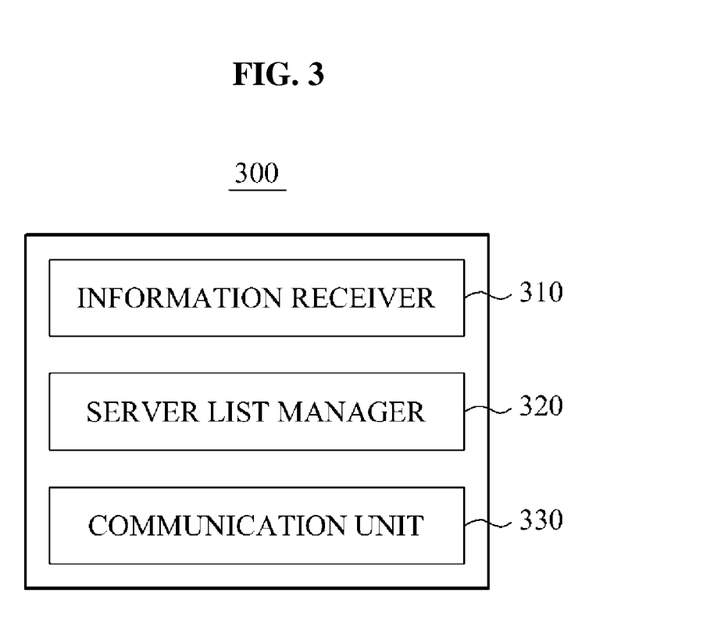
FIG. 3 is a block diagram illustrating a configuration of a client system according to an exemplary embodiment of the present invention.

FIG. 3 is a block diagram that illustrates a configuration of a client system 300 is according to an exemplary embodiment of the present invention. The client system 300 of FIG. 3 may be one of the plurality of clients 110 of FIG. 1. Referring to FIG. 3, the client system 300 may include an information receiver 310, a server list manager 320, and a communication unit 330.

The information receiver 310 may receive, from an integrated cloud management server 200, information about a cache server registered to a virtual layer that is managed by the integrated cloud management server 200. When the registered cache server is removed or non-functioning, the information receiver 310 may further receive information about the removed or non-functioning cache server through the integrated cloud management server 200. In this example, the integrated cloud management server 200 may be the integrated cloud management server 140 of FIG. 1, and the virtual layer may be one of the plurality of virtual layers 120 of FIG. 1. The cache server may be one of the plurality of cache servers 130 of FIG. 1.

Messages including at least one of the information about the registered cache server and the information about the removed or non-functioning cache server may be transmitted from the integrated cloud management server 200 based on a total order and a causal order.

The server list manager 320 may generate or update a server list using information about the registered cache server. In this example, the server list manager 320 may update the server list using information about the removed or non-functioning cache server that is further received by the information receiver 310. Also, the server list manager 320 may change a hashing value of a key using at least one of information about the registered cache server and information about the removed or non-functioning cache server.

The communication unit 330 may have a function of communicating with the is cache server registered to the virtual layer using the server list. For example, the client system 300 may manage the server list by itself and be directly connected to the cache server using the server list without using a proxy server, and thereby communicate with the cache server. Accordingly, it is possible to enhance a performance and scalability.

Figure 4:
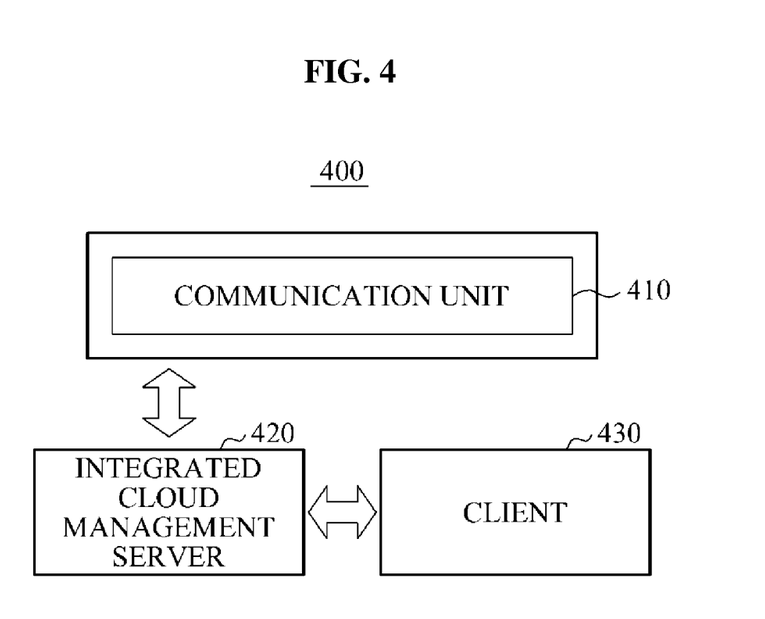
FIG. 4 is a block diagram illustrating a configuration of a cache server according to an exemplary embodiment of the present invention.

FIG. 4 is a block diagram that illustrates a configuration of a cache server 400 according to an exemplary embodiment of the present invention. The cache server 400 of FIG. 4 may be one of the plurality of cache servers 130 of FIG. 1. The cache server 400 may include a communication unit 410. FIG. 4 also illustrates an integrated cloud management server 420 and a client 430. The integrated cloud management server 420 of FIG. 4 may be the integrated cloud management server 140 of FIG. 1, and the client 430 may be one of the plurality of clients 110 of FIG. 1.

The communication unit 410 may communicate with at least one client 430 which is accessible using a server list. For example, when the cache server 400 is registered to one of the plurality of virtual layers that are managed by the integrated cloud management server 420, information associated with the registration may be transmitted to the at least one client 430 that is connected to the corresponding virtual layer through the integrated cloud management server 420. In this example, the server list may be generated or updated at the at least one client 430 using information associated with the registration. The at least one client 430 may access the cache server 400 using the generated or updated cache list. In this example, the communication unit 410 may communicate with the at least one client 430, thereby providing a caching service thereto.

Even in this example, when the cache server 400 is removed or non-functioning, information about removal or non-functioning may be also transmitted to the at least one client 430 connected to the corresponding virtual layer through the integrated cloud management server 420. The server list may be updated at the at least one client 430 using information about the removal or non-functioning.

Figure 5:
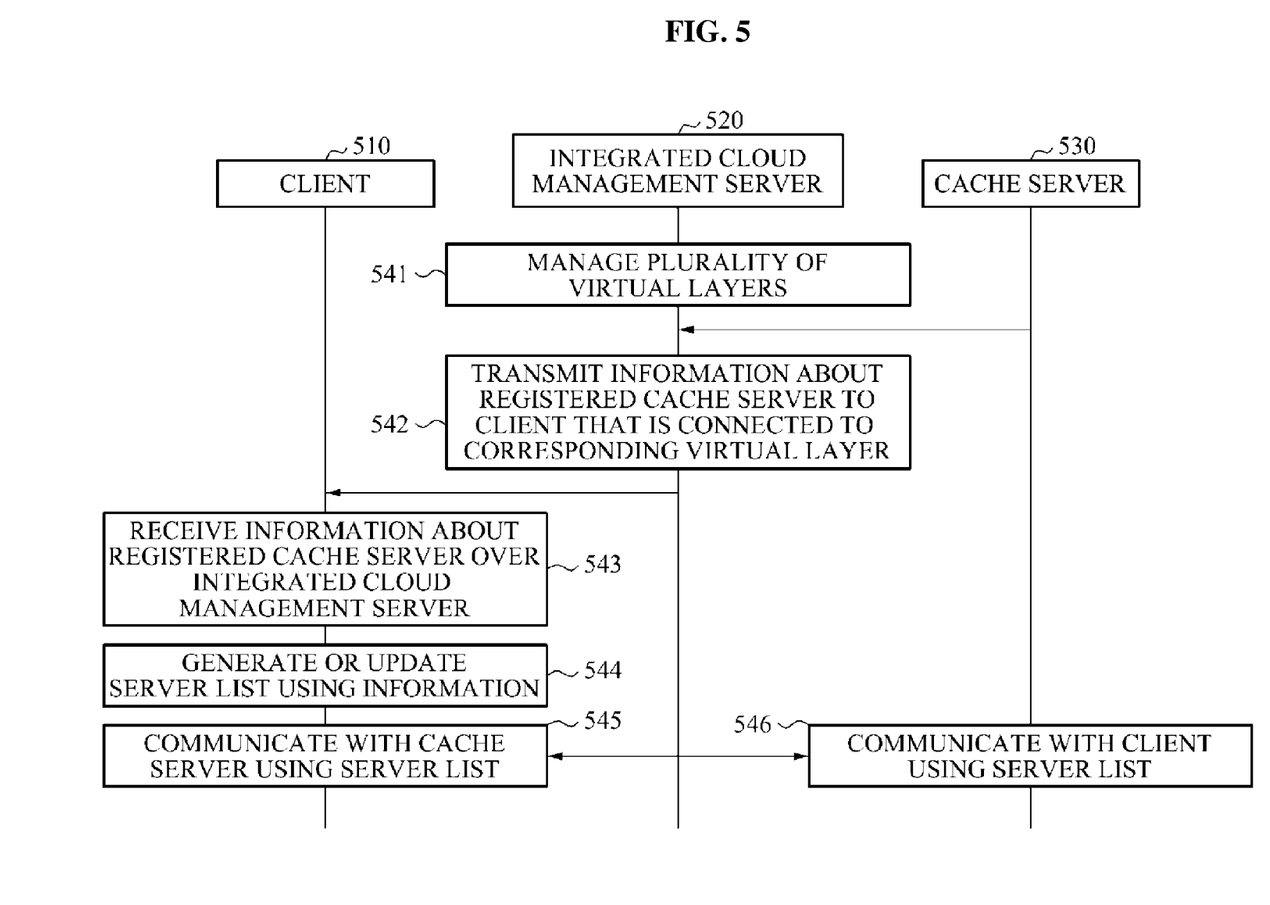
FIG. 5 is a flowchart illustrating a caching service providing method according to an exemplary embodiment of the present invention.

FIG. 5 is a flowchart illustrating a method of providing caching service according to an exemplary embodiment of the present invention. The method of providing caching service may be performed by three components, for example, a client 510, an integrated cloud management server 520, and a cache server 530 that constitute a cache system of FIG. 5. The above components may be the components described above with reference to FIG. 2 through FIG. 5, for example, the client system 300, the integrated cloud management server 200, and the cache server 400, respectively. Caching service providing methods according to other exemplary embodiments of the present invention, performed by respective components, may include only operations performed by the respective corresponding components.

In operation 541, the integrated cloud management server 520 may manage a plurality of virtual layers. A virtual layer may be used to classify a plurality of cache servers, and a caching service with respect to a single service may be provided using a single virtual layer. For example, cache servers to be used by the client 510 may be registered using a single virtual layer and thereby be used to provide a caching service for a service of the client 510.

In operation 542, when the cache server 530 is registered to a corresponding virtual layer among the plurality of virtual layers, the integrated cloud management server 520 may transmit information about the registered cache server 530 to the client 510 that is connected to the corresponding virtual layer. In this example, when the registered cache server 530 is removed or non-functioning, the integrated cloud management server 520 may also transmit information about the removed or non-functioning cache server 530 to the client 510.

In operation 543, the client 510 may receive, through the integrated cloud management server 520, information about the cache server 530 registered to the corresponding virtual layer that is managed by the integrated cloud management server 520. When the registered cache server 530 is removed or non-functioning, the client 510 may further receive information about the removed or non-functioning cache server 530 through the integrated cloud management server 520.

In operation 544, the client 510 may generate or update a server list using information about the registered cache server 530. The client 510 may also update the server list using information about the removed or non-functioning cache server 530 that is received in operation 543. Also, in operation 544, the client 510 may change a hashing value of a key using at least one of information about the registered cache server 530 and information about the removed or non-functioning cache server 530.

In operation 545, the client 510 may communicate with the cache server 530, registered to the corresponding virtual layer, using the server list. In operation 546, the cache server 530 may communicate with the client 510 accessing using the server list.

That is, the client 510 may manage the server list by itself and be directly connected to the cache server 530 without using a proxy server, using the server list, and thereby communicate with the cache server 530. Accordingly, it is possible to enhance a performance and scalability. In addition, it is possible to control all of cache servers using only an operation of the integrated cloud management server 520, and to match a key hashing conformability.

Description not made with reference to FIG. 5 may refer to description made above with reference to FIG. 1 through FIG. 4.

As described above, according to exemplary embodiments of the present invention, it is possible to enhance a performance and scalability by directly connecting a client and a cache server without using a proxy server. In addition, without a boundary between a private cloud and a public cloud, it is possible to control all of cache servers using only an operation of an integrated cloud management server. A client may access a desired cache server using a service code of the client.

The exemplary embodiments according to the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Also, the above file system may be recorded in the computer-readable recording medium.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A cache system, comprising:
a plurality of cache servers each configured to be independently driven, and including at least one first processor configured to be registered to a corresponding virtual layer among a plurality of virtual layers that are managed by a management server; and
the management server operating on a storage device and including at least one second processor configured to transmit information about at least one registered cache server to at least one client device that is connected to the corresponding virtual layer,
wherein the at least one client device, which includes at least one third processor, is associated with at least one of the virtual layers, and the at least one third processor is configured to generate a server list associated with the at least one of the plurality of virtual layers in response to the transmitted information, the transmitted information corresponding to at least one cache server associated with the at least one virtual layer of the plurality of virtual layers,
the registered cache server and the at least one client device are configured to be connected to each other based on the server list,
the at least one second processor is configured to transmit information about a removed or non-functioning cache server of the corresponding virtual layer to the at least one client device associated with the virtual layer in response to the registered cache server being removed or non-functioning in a total order and a causal order, and the at least one third processor is configured to update the server list in response to the received information about the removed or non-functioning cache server.

2. The cache system of claim 1, wherein the at least one third processor is configured to change a hashing value of a key using at least one of information about the registered cache server and information about the removed or non-functioning cache server.

3. A management server, comprising:
a non-transitory storage device;
a first memory having computer readable instructions stored thereon; and
at least one first processor configured to execute the computer readable instructions to,
manage a plurality of virtual layers,
transmit information about a registered cache server to at least one client device that is connected to a corresponding virtual layer, when the cache server is registered to the corresponding virtual layer among the plurality of virtual layers, the cache server including a second memory and at least one second processor, and the client device including a third memory and at least one third processor,
connect the registered cache server and the at least one client device in response to a server list associated with the corresponding virtual layer generated at the at least one client device using the transmitted information,
transmit information about a removed or non-functioning cache server of the corresponding virtual layer to the at least one client device associated with the virtual layer in response to the registered cache server being removed or non-functioning in a total order and a causal order, and
transmit, to the at least one client device, messages comprising at least one of information about the registered cache server and information about the removed or non-functioning cache server, based on a total order and a causal order; and
wherein the server list is updated at the at least one client device using the received information about the removed or non-functioning cache server.

4. The management server of claim 3, wherein a hashing value of a key is changed at the at least one client device using at least one of information about the registered cache server and information about the removed or non-functioning cache server.

5. A client system, comprising:
a non-transitory storage device;
a memory having computer readable instructions stored thereon;
at least one processor configured to execute the computer readable instructions to,
receive, through a management server, information about at least one cache server registered to a corresponding virtual layer among a plurality of virtual layers that is managed by the management server, the corresponding virtual layer being associated with the client system and the at least one cache server registered to the corresponding virtual layer,
generate a server list using information about the registered at least one cache server and save the server list in the storage device, and
communicate with the at least one cache server registered to the virtual layer based on the server list,
receive information about a removed or non-functioning cache server of the corresponding virtual layer through the management server in response to the registered cache server being removed or non-functioning in a total order and a causal order, and update the server list using the received information about the removed or non-functioning cache server.

6. A cache server, comprising:
a non-transitory storage device;
a memory having computer readable instructions stored thereon; and
at least one processor configured to execute the computer readable instructions to,
    communicate with at least one client accessing using a server list, the at least one client associated with at least one of virtual layer of a plurality of virtual layers,
wherein the cache server is configured to be registered to the virtual layer associated with the at least one client among a plurality of virtual layers that are managed by a management server,
information about the registration is transmitted from the management server to the at least one client that is connected to the corresponding virtual layer,
the server list is generated at the at least one client using information about the registration,
when the cache server is removed or non-functioning from the corresponding virtual layer, information about the removal or non-functioning is transmitted in a total order and a causal order from the management server to the at least one client associated with the virtual layer, and
the server list is updated at the at least one client using the received information about the removal or non-functioning.

7. A method that uses at least one processor to provide a caching service, the method comprising:
registering, using the at least one processor, each of a plurality of cache servers, each of the plurality of cache servers being independently driven by a management server, to a corresponding virtual layer among a plurality of virtual layers associated with at least one client and at least one of the plurality of cache servers; and
transmitting, using the at least one processor, information about the registered cache server to the at least one client that is connected to the corresponding virtual layer, the transmitted information corresponding to the at least one cache server associated with corresponding virtual layer,
wherein a server list associated with the corresponding virtual layer is generated at the at least one client using the transmitted information, and the registered cache server and the at least one client are connected to each other based on the server list,
transmitting, using the at least one processor, information about a removed or non-functioning cache server of the corresponding virtual layer to the at least one client associated with the virtual layer in response to the registered cache server being removed or non-functioning in a total order and a causal order, and
updating the server list by the at least one client in response to the received information about the removed or non-functioning cache server.

8. A non-transitory computer-readable storage medium comprising computer readable instructions for causing at least one processor of a computer to perform the method of claim 7.

9. A method that uses at least one processor to provide a caching service, the method comprising:

managing, using the at least one processor, a plurality of virtual layers;
transmitting, using the at least one processor, information about a registered cache server corresponding to at least one virtual layer of the plurality of virtual layers, the at least one virtual layer associated with at least one client to the at least one client that is connected to the corresponding virtual layer, when the cache server is registered to the corresponding virtual layer among the plurality of virtual layers;
wherein a server list associated with the at least one virtual layer is generated at the at least one client using the transmitted information, and
    the registered cache server and the at least one client are connected to each other based on the server list;
transmitting, using the at least one processor, information about a removed or non-functioning cache server of the corresponding virtual layer to the at least one client associated with the virtual layer in response to the registered cache server being removed or non-functioning in a total order and a causal order; and
updating the server list by the at least one client in response to the received information about the removed or non-functioning cache server.

10. A method that uses at least one processor to provide a caching service, the method comprising:
receiving, through a management server, information about a cache server registered to at least one virtual layer of a plurality of virtual layers that are managed by the management server, the registered cache server corresponding to at least one virtual layer of the plurality of virtual layers, the at least one virtual layer associated with the at least one processor;
generating, using the at least one processor, a server list associated with the at least one virtual layer using the received information about the registered cache server;
communicating, using the at least one processor, with the cache server registered to the virtual layer based on the server list;
receiving, using the at least one processor, information about a removed or non-functioning cache server of the corresponding virtual layer through the management server in response to the registered cache server being removed or non-functioning in a total order and a causal order, and
updating, using the at least one processor, the server list using the received information about the removed or non-functioning cache server.

11. A method that uses at least one processor to provide a caching service, the method comprising:
communicating, using the at least one processor, with at least one client accessing using a server list associated with the at least one client, the at least one client being associated with a virtual layer among a plurality of virtual layers that are managed by a management server;
wherein at least one cache server is registered to the associated virtual layer, information about the registration is transmitted from the management server to the at least one client that is connected to the corresponding virtual layer, and
the server list is generated at the at least one client using the information about the registration;
when the cache server is removed or non-functioning, information about the removal or non-functioning of the corresponding virtual layer is transmitted in a total order and a causal order from the management server to the at least one client associated with the virtual layer, and the server list is updated at the at least one client using the received information about the removal or non-functioning.

* * * * *